Jan. 29, 1946.  L. FRANK  2,393,764
ADJUSTABLE NUT
Filed April 22, 1944
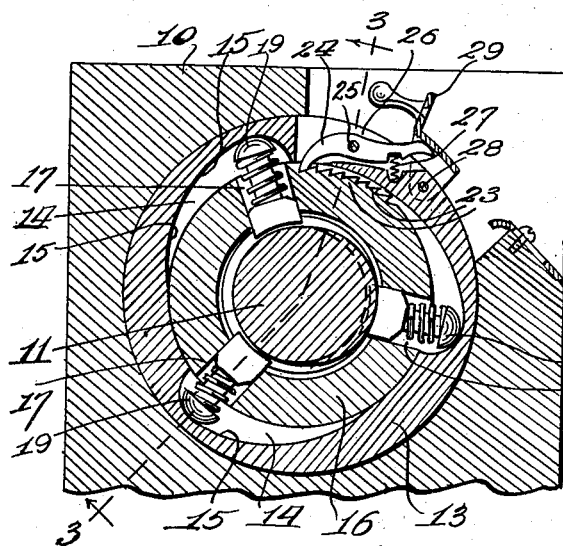
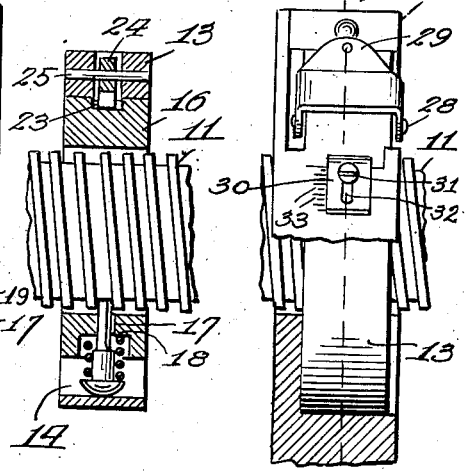
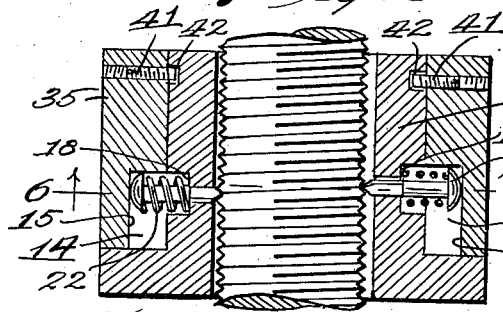
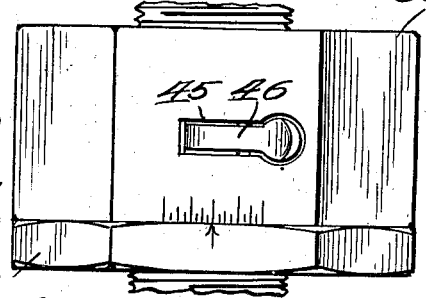
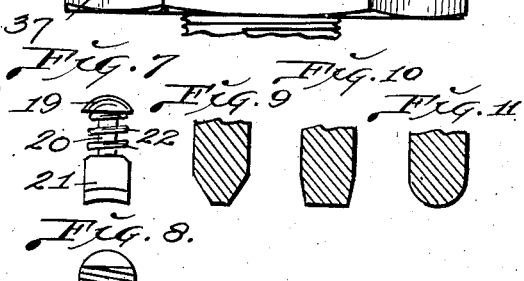
INVENTOR.
LOUIS FRANK.
BY
Martin P. Smith,
ATTY.

Patented Jan. 29, 1946

2,393,764

UNITED STATES PATENT OFFICE 2,393,764

ADJUSTABLE NUT

Louis Frank, Fellows, Calif.

Application April 22, 1944, Serial No. 532,266

3 Claims. (Cl. 74—424.8)

My invention relates to a threadless nut and has for its principal object, to provide a simple, practical and inexpensive nut, devoid of conventional threads and which may be conveniently and advantageously employed for transmitting motion from a threaded shaft, lead screw or the like, to a nonrotating element such as the half nut of a lathe or drill press.

A further object of my invention, is to provide a nut of the character referred to, which may be used as a utility or emergency nut upon threaded shafts or rods of varying diameters, thus, in effect enabling one nut to be used in the place of conventional nuts having threaded openings of definite or standard sizes.

A further object of my invention is, to provide a threadless nut having a plurality of radially movable thread engaging dogs and with simple means for moving same into engagement with the thread of a shaft rod or the like and for releasably securing said dogs in such engagement.

With the foregoing and other objects in view, my invention consists in certain novel features of construction and arrangement of parts which will be hereinafter more fully described and claimed and illustrated in the accompany drawing in which:

Fig. 1 is an elevational view partly in section, of my improved nut and showing a machine part with which it may be associated.

Fig. 2 is a vertical section taken on the line 2—2 of Fig. 1.

Fig. 3 is a cross section taken on the line 3—3 of Fig. 2.

Fig. 4 is a side elevational view of a modified form of the nut.

Fig. 5 is a cross section of the modified form of the nut.

Fig. 6 is a horizontal section taken on the line 6—6 of Fig. 5.

Fig. 7 is a detail view of one of the thread engaging dogs.

Fig. 8 is an end elevational view of the dog.

Figs. 9, 10 and 11 are detail sectional views of different forms of thread engaging dogs.

Referring by numerals to the accompanying drawing particularly the form of nut illustrated in Figs. 1 to 3 inclusive, 10 designates a machine element, for instance the part that receives the half nut which engages the lead screw 11 of a lathe, drill press or the like.

Arranged for limited rotary movement in element 10 is a ring 13, within which is formed one or more pockets 14, the bottoms of which are provided with circumferentially disposed cam or eccentric faces 15.

Loosely arranged within ring 13 is a ring 16 the internal diameter of which is slightly larger than that of screw 11 and formed through said ring at the deepest ends of the pockets 14 are radially disposed apertures 17 which are provided intermediate their ends with shoulders 18.

In the drawing, I have shown the nut provided with three pockets 14 and apertures 17, but it is to be understood that this number may be increased or decreased as desired.

Loosely arranged in each aperture 17 is a thread engaging dog comprising a rounded head 19 which bears on cam surface 15, an intermediate shank 20 and an inner tooth 21 which is adapted to engage in the groove between the threads of screw 11.

An expansive coil spring 22 is disposed between shoulder 18 and head 19 of each dog, thus tending to force said dog outwardly away from the screw.

Formed on the periphery of ring 16 between two of the dog receiving apertures 17 is a series of ratchet teeth 23 which are engaged by the point of a pawl 24, pivoted at 25, in an opening 26 in said ring.

An expansive spring 27 is arranged beneath the rear portion of pawl 24 so as to force the point thereof into engagement with teeth 23.

Pivoted at 28 to ring 13 rearwardly from opening 26, is a pawl releasing lever 29 and adjustably mounted on member 10 to the rear of this lever, is a stop plate 30.

This plate is adjustable my means of a set screw 31 seated in member 10 and which passes through a slot 32 in said plate and the degree of adjustment may be accurately regulated by means of a graduated scale 33, formed on member 10, adjacent said plate.

The construction just described provides means for controlling the rotation of ring 10 carrying pawl 24, relative to ring 16 having the cam surfaces which determine the position of the thread engaging dogs with respect to the diameter of the shaft 11 with which the nut is associated.

When ring 13 is rotated rearwardly a certain distance, the rear end of lever 29 will strike against adjustable stop 30 and thereby swing on pivot 28 to depress the rear end of pawl 24 and disengage the point thereof from the ratchet teeth 23.

In order to achieve best results the thread engaging dogs may be disposed in spiral arrangement to correspond with the pitch of the thread with which they engage and, likewise, the ends of the teeth 21 may be inclined so as to correspond with the pitch of the thread. Further, if desired, the inner end of each dog may be provided with two or three thread engaging teeth as seen in Fig. 8.

The utility or emergency nut illustrated in Figs. 4, 5 and 6 includes an outer member 35 having peripheral wrench receiving faces 36 and arranged for rotary movement within said member is a ring 37 carrying a plurality of spring pressed thread engaging dogs 38, practically identical with the corresponding dogs in the form of nut seen in Figs. 1 to 3 inclusive.

The rounded heads on the outer ends of the dogs 38 bear against the cam surfaces 39 of pockets 40 formed in the inner periphery of member 35.

Parts 35 and 37 are held together for relative rotary movement in any suitable manner, for instance by screws or pins 41 seated in the outer member and engaging in a groove 42 formed in the outer periphery of ring 37, or by a snap ring seated in registering grooves in the two members.

Formed on the periphery of ring 337 is a series of ratchet teeth 43 and pivoted at 44 in a recess 45 in member 35 is a spring pressed pawl 46, the point of which engages said teeth.

In this construction, when member 35 is rotated a short distance toward the right hand the dogs 38 will be moved inward, as a result of the engagement of the heads of said dogs against the cam surfaces 39 and member 35 will be held against reverse rotary motion by pawl 46 engaging the ratchet teeth, until said pawl is released, by inward pressure on its rear end.

Thus the dogs 38 may be moved radially for a distance equal to the depth of the cam surfaces 39 and such distance is sufficient to enable the nut to be interchangeably used on threaded shafts or the like which vary in diameter throughout a range of a half inch more or less.

On nuts of considerable length the thread engaging dogs may be used in multiple, that is, two or more dogs in alignment with each other lengthwise of the nut.

In Figs. 9, 10 and 11, I have shown the inner ends of the dogs shaped for engagement with different shaped standard threads such as V, acme and round. The adjustment of position of the dogs in this form of nut may be regulated by means of a graduated scale on one of the faces 36 of outer member and a mark or arrow head on the periphery of ring 37. (See Fig. 4.)

Thus, it will be seen that I have provided a threadless, adjustable nut, which is simple in structure, inexpensive of manufacture and very effective in performing the functions for which it is intended.

It will be understood that minor changes in the size, form and construction of the various parts of my improved nut may be made and substituted for those herein shown and described, without departing from the spirit of my invention, the scope of which is set forth in the appended claims.

I claim as my invention:

1. The combination with a machine part and a threaded shaft passing through said machine part, of a member arranged for rotation within said machine part, a ring arranged for rotation within said rotary member, spring pressed dogs carried by said ring and adapted to engage the thread of said shaft passing through said ring, the inner periphery of said rotary member being provided with cam faces against which the outer ends of said dogs engage, a ratchet and pawl connection between said outer member and ring and manually operable pawl releasing means carried by said rotary member.

2. The combination as set forth in claim 1, with an adjustable stop on said rotary member for said pawl releasing means.

3. The combination with a machine part and a threaded shaft passing therethrough, of a member arranged for rotation within said machine part, a ring arranged for rotation within said rotary member, spring pressed dogs carried by said ring and adapted to engage said shaft, the inner periphery of said rotary member being provided with cam faces against which the outer ends of said dogs engage, a ratchet and pawl connection between said outer member and ring, a member pivotally mounted on said rotary member and normally engaging the rear end of said pawl and a stop adjustably mounted on the machine part for actuating and limiting the rearward movement of said pivotally mounted member.

LOUIS FRANK.